(12) United States Patent
Dai et al.

(10) Patent No.: US 12,398,525 B2
(45) Date of Patent: Aug. 26, 2025

(54) WATER-REPLENISHING FISHWAY WITH ADAPTIVELY-ADJUSTED FLOATING DOCK

(71) Applicants: CHINA THREE GORGES CORPORATION, Hubei (CN); CHINA THREE GORGES UNIVERSITY, Hubei (CN)

(72) Inventors: Huichao Dai, Hubei (CN); Junjun Tan, Hubei (CN); Dingguo Jiang, Hubei (CN); Lei Chen, Hubei (CN); Xiaotao Shi, Hubei (CN); Yu Wang, Hubei (CN)

(73) Assignees: CHINA THREE GORGES CORPORATION (CN); CHINA THREE GORGES UNIVERSITY (CN)

( * ) Notice: Subject to any disclaimer, the term of this patent is extended or adjusted under 35 U.S.C. 154(b) by 104 days.

(21) Appl. No.: 18/032,488

(22) PCT Filed: Feb. 8, 2022

(86) PCT No.: PCT/CN2022/075433
§ 371 (c)(1),
(2) Date: Apr. 18, 2023

(87) PCT Pub. No.: WO2022/174742
PCT Pub. Date: Aug. 25, 2022

(65) Prior Publication Data
US 2024/0110355 A1   Apr. 4, 2024

(30) Foreign Application Priority Data
Feb. 22, 2021   (CN) .......................... 202110197324.9

(51) Int. Cl.
*E02B 8/08* (2006.01)

(52) U.S. Cl.
CPC .................................... *E02B 8/085* (2013.01)

(58) Field of Classification Search
CPC ................................... E02B 8/085; E02B 8/08
See application file for complete search history.

(56) References Cited

U.S. PATENT DOCUMENTS

| 5,139,364 A | 8/1992 | Takahashi et al. |
| 2017/0241093 A1 | 8/2017 | Bertrand et al. |
| (Continued) | | |

FOREIGN PATENT DOCUMENTS

| CN | 2002115243 A | 4/2002 |
| CN | 1863970 A | 11/2006 |
| (Continued) | | |

OTHER PUBLICATIONS

International Search Report of PCT/CN2022/075433.

*Primary Examiner* — Sean D Andrish

(57) ABSTRACT

A water-replenishing fishway with an adaptively-adjusted floating dock is provided. The water-replenishing fishway comprises a fishway body, wherein the bottom of the fishway body is rotationally connected with a floating dock structure, an auxiliary swimming structure is arranged inside the fishway body, and an adjusting structure used to adjust the auxiliary swimming board of the auxiliary swimming structure is arranged on said floating dock structure. The fishway body is excavated with a sliding groove fitting with the sliding block, a first spring is arranged between the sides of the sliding groove and the sliding block, and the bottom of the sliding block is articulated with a roller, which is in contact with the surface of the moving plate of the adjusting structure.

10 Claims, 6 Drawing Sheets

(56) References Cited

U.S. PATENT DOCUMENTS

2019/0119874 A1* 4/2019 Aittaniemi .............. E02B 8/085
2022/0106754 A1* 4/2022 Straalsund .............. E02B 8/085

FOREIGN PATENT DOCUMENTS

| | | | |
|---|---|---|---|
| CN | 202227324 | U | 5/2012 |
| CN | 104018473 | A | 9/2014 |
| CN | 205475068 | U | 8/2016 |
| CN | 108589663 | * | 9/2018 |
| CN | 108775001 | A | 11/2018 |
| CN | 108824381 | A | 11/2018 |
| CN | 108999156 | A | 12/2018 |
| CN | 210395269 | U | 4/2020 |
| CN | 211472427 | U | 9/2020 |
| CN | 112942264 | A | 6/2021 |
| FR | 3003582 | * | 9/2014 |
| KR | 101073437 | B1 | 10/2011 |
| WO | WO 2005/033420 | * | 4/2005 |

* cited by examiner

WATER-REPLENISHING FISHWAY WITH ADAPTIVELY-ADJUSTED FLOATING DOCK

CROSS-REFERENCE TO RELATED APPLICATIONS

This Application is a national stage application of PCT/CN2022/075433. This application claims priorities from PCT Application No. PCT/CN2022/075433, filed Feb. 8, 2022, and from the Chinese patent application 202110197324.9 filed Feb. 22, 2021, the content of which are incorporated herein in the entirety by reference.

TECHNICAL FIELD

The present disclosure relates to the technical field of water-replenishing fishways, in particular to a water-replenishing fishway with an adaptively-adjusted floating dock.

BACKGROUND

A fishway is a passage for fish to migrate, that is, an artificial trench for fish to migrate through a water gate or a dam. Upward tracing behaviors of fish are mainly considered for a fishway design. At the downstream of a gate dam, fish are often subject to the attraction of water flow, so as to enter the fishway. Fish swim upstream by themselves overcoming the flow velocity in the fishway. Upward tracing behaviors of fish are mainly considered for a fishway design. At the downstream of a gate dam, fish are often subject to the attraction of water flow, so as to enter the fishway. The fish swimming upwards need to rely on their own strength in the fishway to overcome the flow and swim upstream, while the fish swimming downwards can go down the river through the fishway. During installation and use of a traditional fishway, it is not easy to adjust the fishway, and when the upstream and downstream levels defer from each other and the drop between them changes, the fishway cannot make a good upstream and downstream passage, so it is not conducive to fish's migration. Moreover, there is no good fish's habitat on the fishway, and no good facilities for holding or auxiliary device for resting when the fish swimming upstream are exhausted, that affects the migration efficiency of fish.

SUMMARY

The present disclosure aims to overcome the above defect by providing a water-replenishing fishway with an adaptively-adjusted floating dock, so as to solve the problem mentioned in the background art.

In order to solve the above technical problem, the technical scheme adopted in the present disclosure is as follows:

A water-replenishing fishway with an adaptively-adjusted floating dock, comprising: a fishway body, wherein the bottom of the fishway body is rotationally connected with a floating dock structure, an auxiliary swimming structure is arranged inside the fishway body, and an adjusting structure used to adjust the auxiliary swimming board of the auxiliary swimming structure is arranged on the floating dock structure.

Preferably, the auxiliary swimming structure includes a plurality of auxiliary swimming boards, each of which is rotationally connected with one end of an interacting column, the other end of the interacting column is rotationally connected with one end of a sliding block, and the other end of the sliding block is slidingly connected to the fishway body.

Preferably, the fishway body is excavated with a sliding groove fitting with the sliding block, a first spring is arranged between the sides of the sliding groove and the sliding block, and the bottom of the sliding block is articulated with a roller, which is in contact with the surface of the moving plate of the adjusting structure.

Preferably, an air delivering device is further arranged on the fishway body, the air delivering device includes a housing, inside which is arranged an air pump, the output end of which is connected to one end of an air delivering pipe, and the other end of the air delivering pipe is connected to a plurality of air inlet pipes, each of which is provided with an unidirectional air outlet valve.

Preferably, a top block is fixed on one side of the unidirectional air outlet valve, the top block props against on one side of an adjusting plate, and the other side of the adjusting plate is connected with the auxiliary swimming board by means of a second spring.

Preferably, a guiding board is further arranged on the downstream end of the fishway body, and the guiding board is a triangular column structure.

Preferably, the floating dock structure includes a fixing base, the surface of which is provided with a mounting hole, the top of the fixing base is fixedly connected with the bottom of a fixing frame, one side of the fixing frame is fixedly connected with a waterproof cover, a motor is fixed inside the waterproof cover, the output end of the motor is fixedly connected with a shaft base by means of a rotary shaft, the upper portion of the shaft base is fixedly connected with the bottom of the fishway body, and the shaft base is rotationally connected with the top of the fixing frame.

Preferably, the adjusting structure includes a moving plate, which is slidingly connected with the inner side wall of the fishway body, a plurality of racks is fixed on the upper side of the moving plate, the rack meshes with a gear, which is fixedly connected with the lower side of the auxiliary swimming board by means of a fixing shaft, the lower side of the moving plate is excavated with a groove fitting with a pushing rod and a pushing column, respectively, the pushing rod and the pushing column are both articulated on the inner side wall of the fishway body, the lower side of the pushing rod props against the top of a fixing rod, the lower side of the pushing column props against a fixing column, and the fixing rod and the pushing column both pass through the thorough hole of the fishway body and are fixed on the upper end of the fixing frame of the floating dock structure.

Preferably, a third spring is further arranged between the moving plate and the fishway body.

The present disclosure has the following beneficial effects:

1. The fixing piece is put into the inside of the mounting hole, so that the fixing base is fixed between the upstream and downstream, providing a support for the fishway body, and the water flows through the inner wall of the fishway body, thus the water overflows the auxiliary swimming board. The downstream fish swim into the inside of the fishway body through the guiding board, and arrive at the top of the fishway body through a plurality of auxiliary swimming boards successively step by step, so that the fish swimming upstream through the auxiliary swimming board can stay between the auxiliary swimming board and the inner wall of the fishway body to rest when they are exhausted. Furthermore, the auxiliary swimming board set at an inclined upward angle can prevent the fish from washing downstream by a water flow during rest, and the upstream fish can wash directly downstream with a water flow through the fishway body.

2. When the upstream and downstream levels defer from each other, if the downstream water level rising and the upstream water level descending cause a drop between them to decrease, the motor drives the rotatory shaft to rotate, so that the shaft base and the fishway body rotate clockwise and the bottom and top of the fishway body are in contact with the downstream and upstream having the decreased drop between them, ensuring that there exists the water flow inside the fishway body for fish to migrate. For the same reason, if the downstream water level descending and the upstream water level rising cause a drop between them to increase, the motor under the control drives the shaft base and the fishway body to rotate counterclockwise to avoid the fish from difficultly migrating as the water level rises over the fishway body, so as to adjust the fishway body to assist the fish's migration.

3. When the fishway body rotates clockwise to adapt to the decrease in the water level drop, the pushing rod rotates clockwise under the limit against the fixing rod to push the moving plate to slide upwards, so that the rack slides upwards and drives the gear to rotate counterclockwise and the auxiliary swimming board rotates counterclockwise and maintains the original inclination angle to the horizontal plane. When the fishway body rotates counter clockwise to adapt to the increase in the water level drop, the pushing column rotates counterclockwise under the limit against the fixing column to push the moving plate and the rack to slide downwards, so that the gear rotates clockwise and the auxiliary swimming board rotates clockwise and still maintains the original inclination angle to the horizontal plane, ensuring that the migratory fish have consistent physical output and maintain physical strength. The air pump is energized to input the air into the air delivering pipe, so that the air enters a plurality of air inlet pipes from the air delivering pipe, and enters the inside of the fishway body through an unidirectional air outlet valve for migratory fish to breathe, so this design is beneficial to fish's migration.

4. The adjusting plate connected with the auxiliary swimming board props against the top block of the side wall of the unidirectional air outlet valve under the elastic force of the second spring, enhancing the firmness of the installation of the unidirectional air outlet valve and avoiding it from loosening in the process of delivering oxygen to fish. During the rotation of the auxiliary swimming board, the second spring extends to push the adjusting plate against the top block, and when the second spring compresses, the adjusting plate still props against the top block. Thus, during the rotation of the auxiliary swimming board, this design ensures that the adjusting plate always props against the top block and the unidirectional air outlet valve and avoids the unidirectional air outlet valve from loosening, so as to help fish to breathe oxygen and keep physical strength for migration.

5. The present disclosure can adaptively adjust the angle of the fishway body and auxiliary swimming board and effectively assist the fish's migration.

Figure 1:
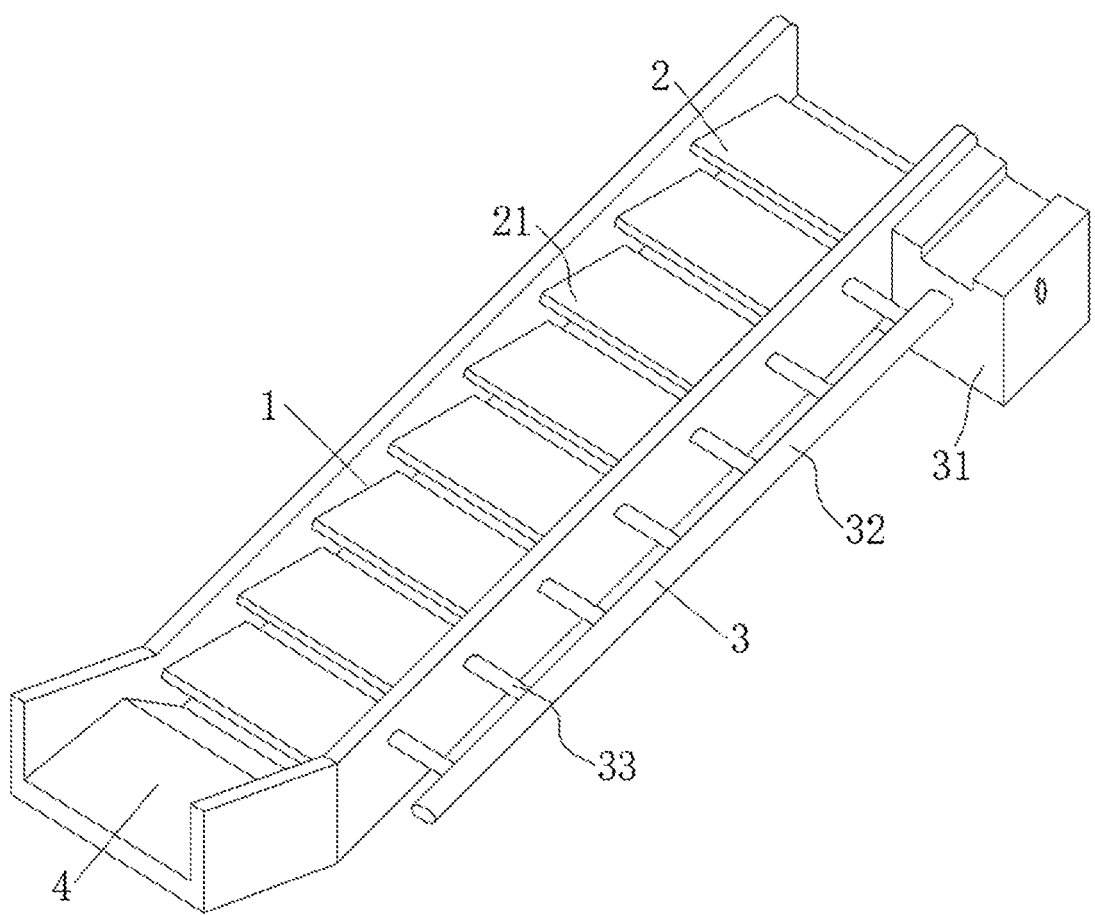
FIG. 1 is a steric structure diagram of the present disclosure.

Where, 1—fishway body; 2—auxiliary swimming structure; 21—auxiliary swimming board; 22—interacting column; 23—sliding block; 24—first spring; 25—sliding groove; 26—fixing shaft; 27—roller; 3—air delivering device; 31—housing; 32—air delivering pipe; 33—air inlet pipe; 34—unidirectional air outlet valve; 35—air pump; 36—top block; 37—adjusting plate; 38—second spring; 4—guiding board; 5—floating dock structure; 51—fixing base; 52—fixing frame; 53—mounting hole; 54—shaft base; 55—motor; 56—waterproof cover; 57—rotary shaft; 6—adjusting structure; 61—moving plate; 62—rack; 63—gear; 64—pushing rod; 65—fixing rod; 66—pushing column; 67—fixing column; 68—third spring.

DETAILED DESCRIPTION OF SOME EMBODIMENTS

We shall further describe the present disclosure in detail in combination with the drawings and examples as follows.

As shown in FIGS. 1~6, a water-replenishing fishway with an adaptively-adjusted floating dock, comprising: a fishway body 1, wherein the bottom of the fishway body 1 is rotationally connected with a floating dock structure 5, an auxiliary swimming structure 2 is arranged inside the fishway body 1, and an adjusting structure 6 used to adjust the auxiliary swimming board 21 of the auxiliary swimming structure 2 is arranged on the floating dock structure 5.

Figure 3:
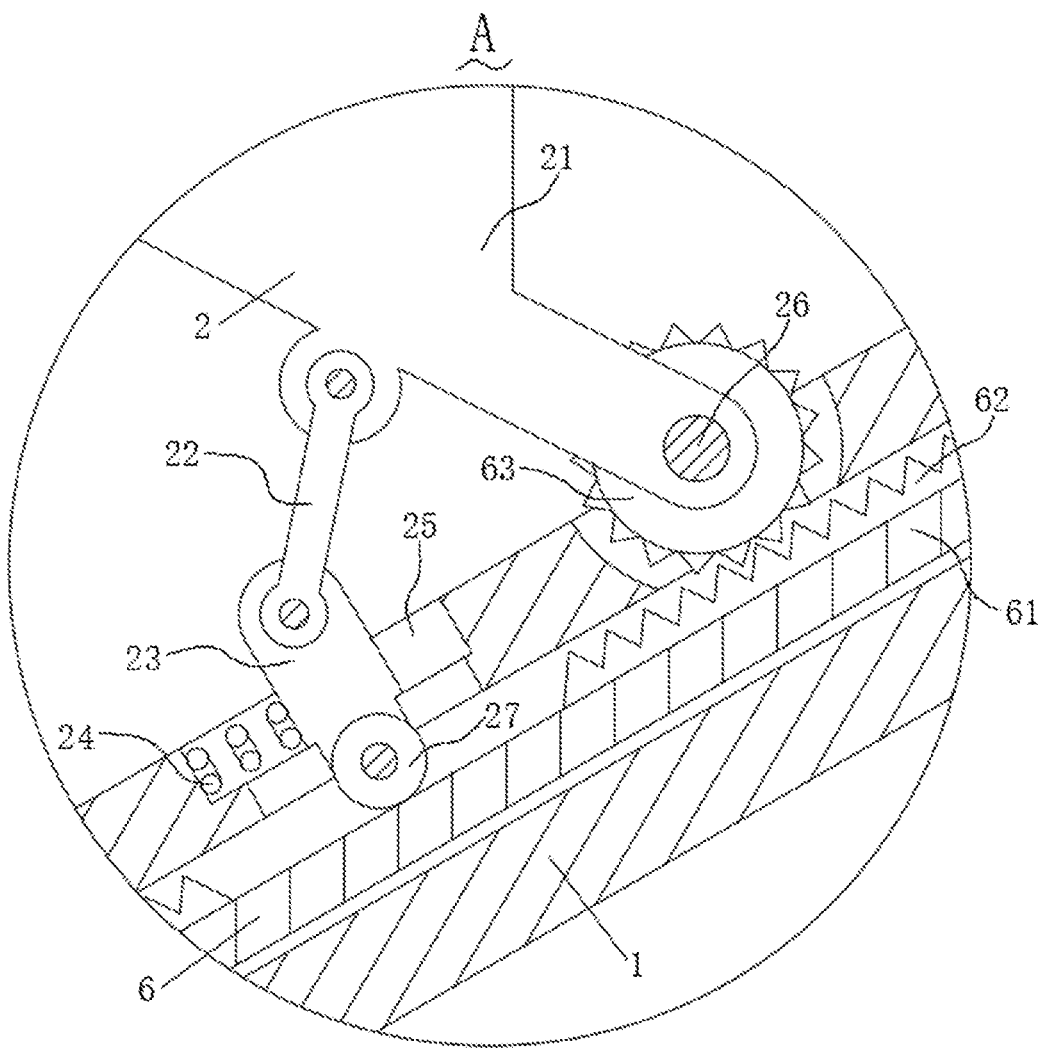
FIG. 3 is an enlarged structure diagram at A in FIG. 2.

Preferably, as shown in FIG. 3, the auxiliary swimming structure 2 includes a plurality of auxiliary swimming boards 21, each of which is rotationally connected with one end of an interacting column 22, the other end of the interacting column 22 is rotationally connected with one end of a sliding block 23, and the other end of the sliding block 23 is slidingly connected to the fishway body 1.

Preferably, the fishway body 1 is excavated with a sliding groove 25 fitting with the sliding block 23, a first spring 24 is arranged between the sides of the sliding groove 25 and the sliding block 23, and the bottom of the sliding block 23 is articulated with a roller 27, which is in contact with the surface of the moving plate 61 of the adjusting structure 6.

In the technical scheme, the fishway body 1 is installed between the upstream and downstream, so that the water flows through the inner wall of the fishway body 1, thus the water overflows the auxiliary swimming board 21. The downstream fish swim into the inside of the fishway body 1 through the guiding board 4, and arrive at the top of the fishway body 1 through a plurality of auxiliary swimming boards 21 successively step by step, so that the fish swimming upstream through the auxiliary swimming board 21 can stay between the auxiliary swimming board 21 and the inner wall of the fishway body 1 to rest when they are exhausted. Furthermore, the auxiliary swimming board 21 set at an inclined upward angle can prevent the fish from washing downstream by a water flow during rest, and the upstream fish can wash directly downstream with a water flow through the fishway body 1. As the auxiliary swimming board 21 rotates, the interacting column 22 moves, pushing the sliding block 23 to slide back and forth on the inner wall of the fishway body 1, so that the first spring 24 compresses and elongates, always supporting the auxiliary swimming board 21 and effectively assisting the fish's migration.

Preferably, as shown in FIG. 1, an air delivering device 3 is further arranged on the fishway body 1, the air delivering device 3 includes a housing 31, inside which is arranged an air pump 35, the output end of which is connected to one end of an air delivering pipe 32, and the other end of the air delivering pipe 32 is connected to a plurality of air inlet pipes 33, each of which is provided with an unidirectional air outlet valve 34.

Figure 6:
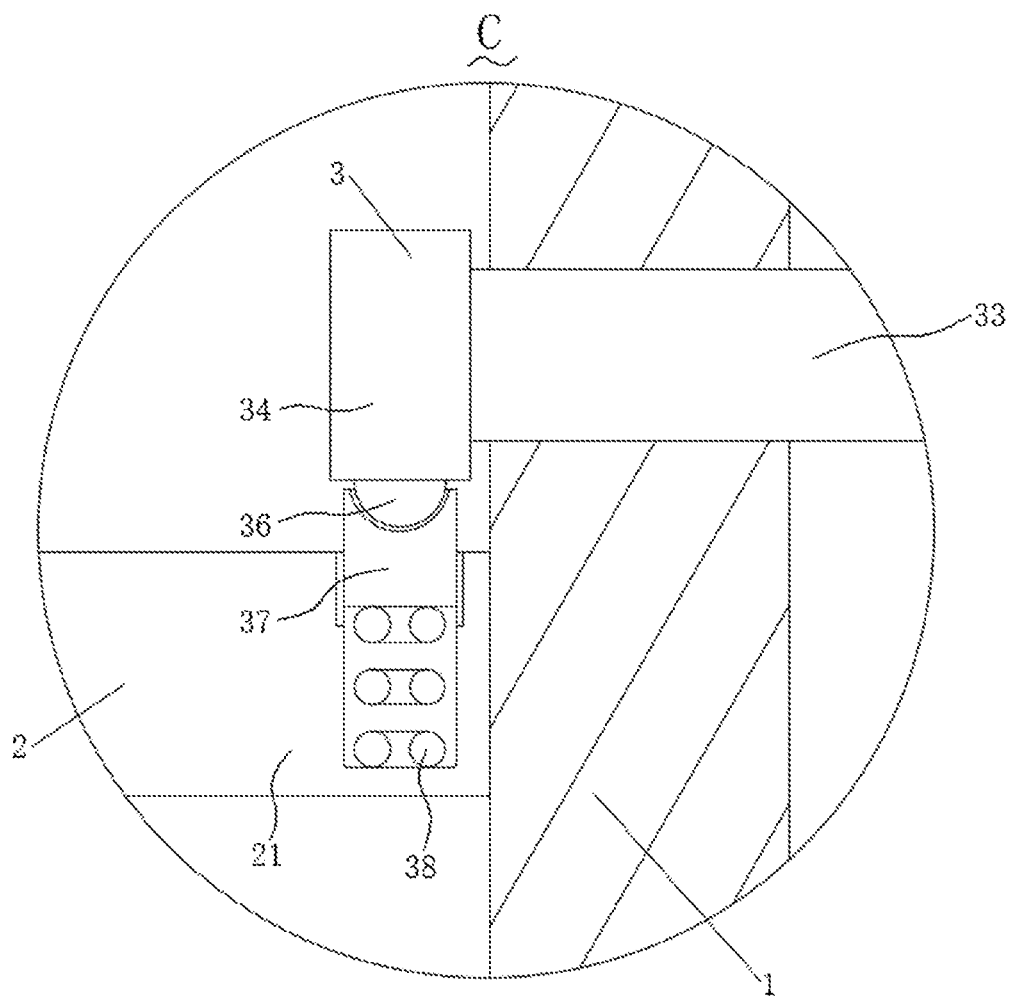
FIG. 6 is an enlarged structure diagram at C in FIG. 5.

Preferably, as shown in FIG. 6, a top block 36 is fixed on one side of the unidirectional air outlet valve 34, the top block 36 props against on one side of an adjusting plate 37, and the other side of the adjusting plate 37 is connected with the auxiliary swimming board 21 by means of a second spring 38.

Preferably, a guiding board 4 is further arranged on the downstream end of the fishway body 1, and the guiding board 4 is a triangular column structure.

Figure 2:
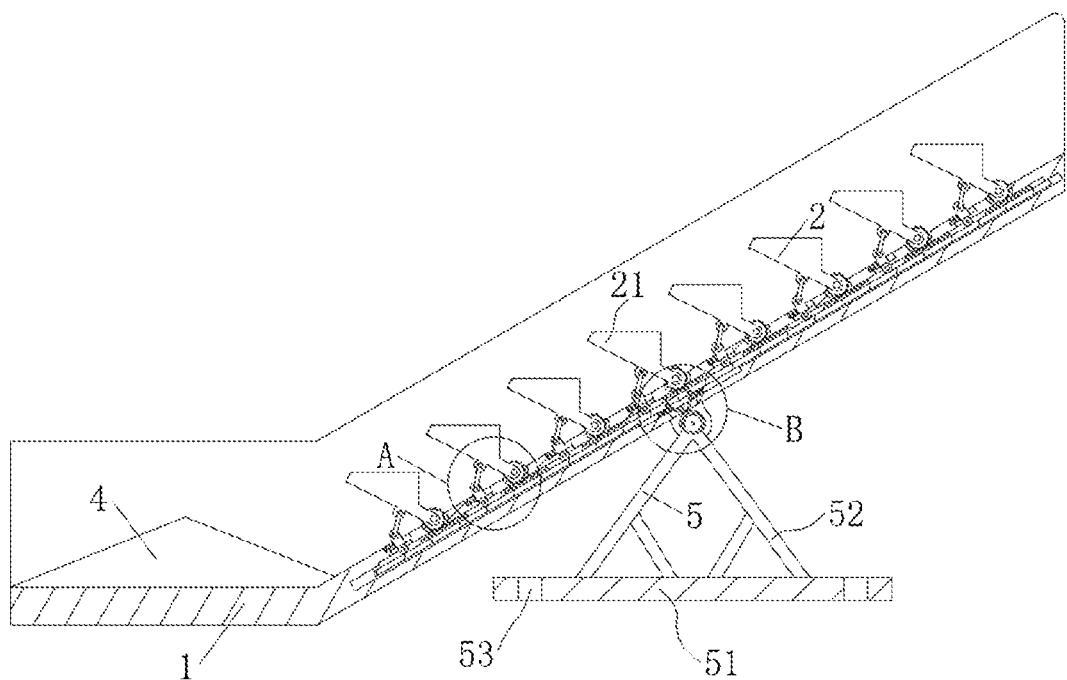
FIG. 2 is a cross-sectional structure diagram of the of the present disclosure.

Preferably, as shown in FIG. 2, the floating dock structure 5 includes a fixing base 51, the surface of which is provided with a mounting hole 53, the top of the fixing base 51 is fixedly connected with the bottom of a fixing frame 52, one side of the fixing frame 52 is fixedly connected with a waterproof cover 56, a motor 55 is fixed inside the waterproof cover 56, the output end of the motor 55 is fixedly connected with a shaft base 54 by means of a rotary shaft 57, the upper portion of the shaft base 54 is fixedly connected with the bottom of the fishway body 1, and the shaft base 54 is rotationally connected with the top of the fixing frame 52.

Preferably, as shown in FIG. 3, the adjusting structure 6 includes a moving plate 61, which is slidingly connected with the inner side wall of the fishway body 1, a plurality of racks 62 is fixed on the upper side of the moving plate 61, the rack 62 meshes with a gear 63, which is fixedly connected with the lower side of the auxiliary swimming board 21 by means of a fixing shaft 26, the lower side of the moving plate 61 is excavated with a groove fitting with a pushing rod 64 and a pushing column 66, respectively, the pushing rod 64 and the pushing column 66 are both articulated on the inner side wall of the fishway body 1, the lower side of the pushing rod 64 props against the top of a fixing rod 65, the lower side of the pushing column 66 props against a fixing column 67, and the fixing rod 65 and the pushing column 66 both pass through the thorough hole of the fishway body 1 and are fixed on the upper end of the fixing frame 52 of the floating dock structure 5.

Preferably, a third spring 68 is further arranged between the moving plate 61 and the fishway body 1.

In the technical scheme, while the auxiliary swimming board 21 is rotating and keeping itself tilted to push the sliding block 23 to slide, the roller 27 rolls on the upper surface of the moving plate 61, so that the roller 27 always props against the moving plate 61, avoiding the moving plate 61 from shaking. While the moving plate 61 is sliding up and down to push the gear 63 to rotate, the third spring 68 compresses to generate elastic force, enabling the moving plate 61 to stably slide.

Figure 4:
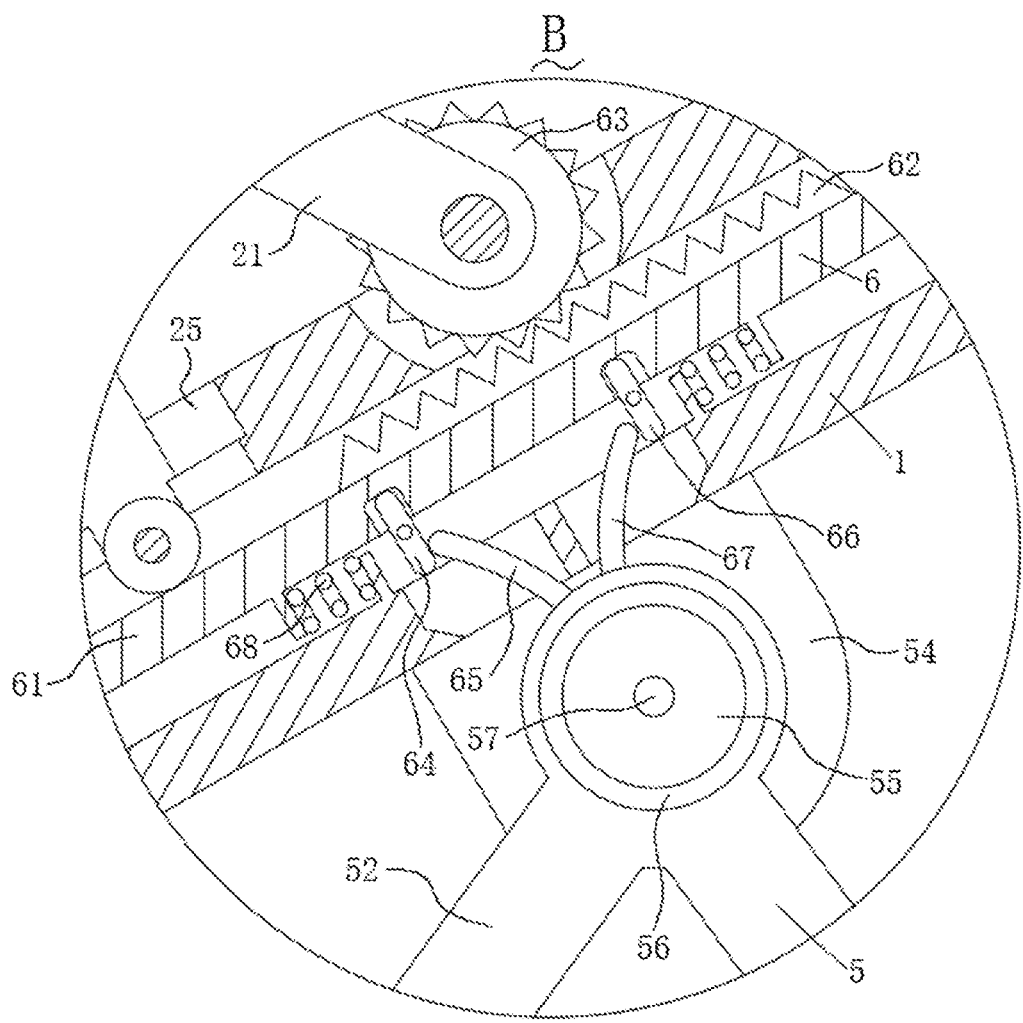
FIG. 4 is an enlarged structure diagram at B in FIG. 2.
Figure 5:
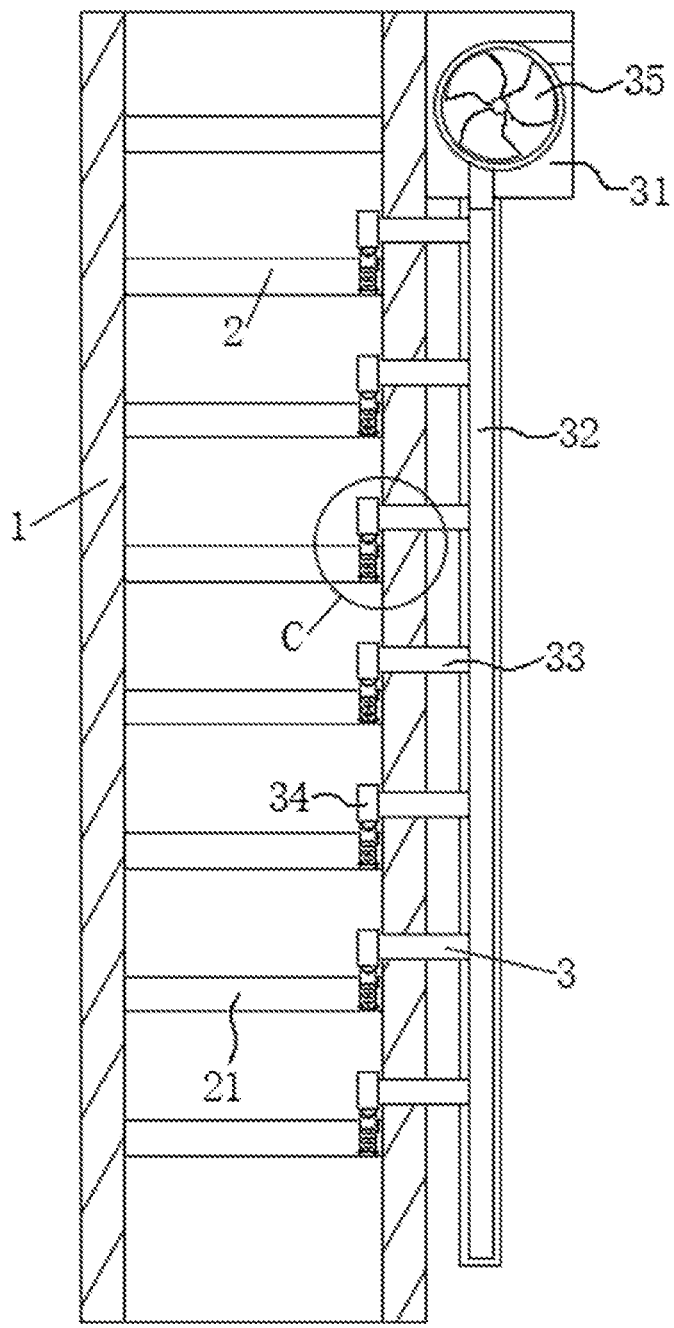
FIG. 5 is a connection diagram of the of the fishway body, the auxiliary swimming structure and the air delivering structure of the present disclosure.

The operating principle in this example is as follows. The fixing piece is put into the inside of the mounting hole 53, so that the fixing base SI is fixed between the upstream and downstream, providing a support for the fishway body 1, and the water flows through the inner wall of the fishway body 1, thus the water overflows the auxiliary swimming board 21. The downstream fish swim into the inside of the fishway body 1 through the guiding board 4, and arrive at the top of the fishway body 1 through a plurality of auxiliary swimming boards 21 successively step by step, so that the fish swimming upstream through the auxiliary swimming board 21 can stay between the auxiliary swimming board 21 and the inner wall of the fishway body 1 to rest when they are exhausted. Furthermore, the auxiliary swimming board 21 set at an inclined upward angle can prevent the fish from washing downstream by a water flow during rest, and the upstream fish can wash directly downstream with a water flow through the fishway body 1. When the upstream and downstream levels defer from each other, the motor 55 runs under control, if the downstream water level rising and the upstream water level descending cause a drop between them to decrease, as shown in FIG. 4, the motor 55 drives the rotatory shaft 57 to rotate, so that the shaft base 54 and the fishway body 1 rotate clockwise and the bottom and top of the fishway body 1 are in contact with the downstream and upstream having the decreased drop between them, ensuring that there exists the water flow inside the fishway body 1 for fish to migrate. For the same reason, if the downstream water level descending and the upstream water level rising cause a drop between them to increase, the motor 55 under the control drives the shaft base 54 and the fishway body 1 to rotate counterclockwise to avoid the fish from difficultly migrating as the water level rises over the fishway body 1, so as to adjust the fishway body 1 to assist the fish's migration. When the fishway body 1 rotates clockwise to adapt to the decrease in the water level drop, the pushing rod 64 rotates clockwise under the limit against the fixing rod 65 to push the moving plate 61 to slide upwards, so that the rack 62 slides upwards and drives the gear 63 to rotate counterclockwise and the auxiliary swimming board 21 rotates counterclockwise and maintains the original inclination angle to the horizontal plane. When the fishway body 1 rotates counterclockwise to adapt to the increase in the water level drop, the pushing column 66 rotates counterclockwise under the limit against the fixing column 67 to push the moving plate 61 and the rack 62 to slide downwards, so that the gear 63 rotates clockwise and the auxiliary swimming board 21 rotates clockwise and still maintains the original inclination angle to the horizontal plane, ensuring that the migratory fish have consistent physical output and maintain physical strength. The air pump 35 is energized to input the air into the air delivering pipe 32, as shown in FIG. 5, so that the air enters a plurality of air inlet pipes 33 from the air delivering pipe 32, and enters the inside of the fishway body 1 through an unidirectional air outlet valve 34 for migratory fish to breathe, so this design is beneficial to fish's migration. The adjusting plate 37 connected with the auxiliary swimming board 21 props against the top block 36 of the side wall of the unidirectional air outlet valve 34 under the elastic force of the second spring 38, enhancing the firmness of the installation of the unidirectional air outlet valve 34 and avoiding it from loosening in the process of delivering oxygen to fish. During the rotation of the auxiliary swimming board 21, the second spring 38 extends to push the adjusting plate 37 against the top block 36, and when the second spring 38 compresses, the adjusting plate 37 still props against the top block 36. Thus, during the rotation of the auxiliary swimming board 21, this design ensures that the adjusting plate 37 always props against the top block 36 and the unidirectional air outlet valve 34 and avoids the unidirectional air outlet valve 34 from loosening, so as to help fish to breathe oxygen and keep physical strength for migration.

The above embodiments are only preferred technical solutions of the present disclosure, and should not be regarded as limiting the present disclosure. The embodiments in the present application and the features in the embodiments can be arbitrarily combined with each other without conflict. The scope of protection of the present disclosure shall be the technical solutions recorded in the claims, including the equivalent alternatives of the technical features in the technical solutions recorded in the claims. Equivalent substitutions and improvements in the scope are also included in the scope of protection of the present disclosure.

What is claimed is:

1. A water-replenishing fishway with an adaptively-adjusted floating dock, comprising: a fishway body (1), wherein a bottom of said fishway body (1) is rotationally connected with a floating dock structure (5), an auxiliary swimming structure (2) is arranged inside said fishway body (1), and an adjusting structure (6) used to adjust an auxiliary swimming board (21) of said auxiliary swimming structure (2) is arranged on said floating dock structure (5), said fishway body (1) is excavated with a sliding groove (25) fitting with the sliding block (23), a first spring (24) is arranged between sides of the sliding groove (25) and the sliding block (23), and a bottom of the sliding block (23) is articulated with a roller (27), which is in contact with a surface of a moving plate (61) of said adjusting structure (6).

2. The water-replenishing fishway with the adaptively-adjusted floating dock according to claim 1, wherein said auxiliary swimming structure (2) includes a plurality of auxiliary swimming boards (21), each of the plurality of auxiliary swimming boards is rotationally connected with one end of an interacting column (22), the other end of the interacting column (22) is rotationally connected with one end of a sliding block (23), and the other end of the sliding block (23) is slidingly connected to said fishway body (1).

3. The water-replenishing fishway with the adaptively-adjusted floating dock according to claim 2, wherein said adjusting structure (6) includes the moving plate (61), which is slidingly connected with an inner side wall of said fishway body (1), a plurality of racks (62) is fixed on an upper side of the moving plate (61), one of the plurality of racks (62) meshes with a gear (63), which is fixedly connected with a lower side of the auxiliary swimming board (21) by means of a fixing shaft (26), a lower side of the moving plate (61) is excavated with a groove fitting with a pushing rod (64) and a pushing column (66), respectively, the pushing rod (64) and the pushing column (66) are both articulated on the inner side wall of said fishway body (1), a lower side of the pushing rod (64) props against a top of a fixing rod (65), a lower side of the pushing column (66) props against a fixing column (67), and the fixing rod (65) and the pushing column (66) both pass through a thorough hole of the fishway body (1) and are fixed on an upper end of a fixing frame (52) of said floating dock structure (5).

4. The water-replenishing fishway with the adaptively-adjusted floating dock according to claim 1, wherein an air delivering device (3) is further arranged on said fishway body (1), the air delivering device (3) includes a housing (31), an air pump (35) is arranged within the housing an output end of the air pump is connected to one end of an air delivering pipe (32), and an other end of the air delivering pipe (32) is connected to a plurality of air inlet pipes (33), each of the plurality of air inlet pipes is provided with an unidirectional air outlet valve (34).

5. The water-replenishing fishway with the adaptively-adjusted floating dock according to claim 4, wherein a top block (36) is fixed on one side of the unidirectional air outlet valve (34), the top block (36) props against on one side of an adjusting plate (37), and an other side of the adjusting plate (37) is connected with the auxiliary swimming board (21) by means of a second spring (38).

6. The water-replenishing fishway with the adaptively-adjusted floating dock according to claim 1, wherein a guiding board (4) is further arranged on a downstream end of said fishway body (1), and the guiding board (4) is a triangular column structure.

7. The water-replenishing fishway with the adaptively-adjusted floating dock according to claim 1, wherein said floating dock structure(S) includes a fixing base (51), a surface of the fixing base is provided with a mounting hole (53), a top of the fixing base (51) is fixedly connected with a bottom of a fixing frame (52), one side of the fixing frame (52) is fixedly connected with a waterproof cover (56), a motor (55) is fixed inside the waterproof cover (56), an output end of the motor (55) is fixedly connected with a shaft base (54) by means of a rotary shaft (57), an upper portion of the shaft base (54) is fixedly connected with the bottom of the fishway body (1), and the shaft base (54) is rotationally connected with a top of the fixing frame (52).

8. The water-replenishing fishway with the adaptively-adjusted floating dock according to claim 1, wherein said adjusting structure (6) includes the moving plate (61), which is slidingly connected with an inner side wall of said fishway body (1), a plurality of racks (62) is fixed on an upper side of the moving plate (61), one of the plurality of racks (62) meshes with a gear (63), which is fixedly connected with a lower side of the auxiliary swimming board (21) by means of a fixing shaft (26), a lower side of the moving plate (61) is excavated with a groove fitting with a pushing rod (64) and a pushing column (66), respectively, the pushing rod (64) and the pushing column (66) are both articulated on the inner side wall of said fishway body (1), a lower side of the pushing rod (64) props against a top of a fixing rod (65), a lower side of the pushing column (66) props against a fixing column (67), and the fixing rod (65) and the pushing column (66) both pass through a thorough hole of the fishway body (1) and are fixed on an upper end of a fixing frame (52) of said floating dock structure (5).

9. The water-replenishing fishway with the adaptively-adjusted floating dock according to claim 8, wherein a third spring (68) is further arranged between the moving plate (61) and said fishway body (1).

10. The water-replenishing fishway with the adaptively-adjusted floating dock according to claim 1, wherein said adjusting structure (6) includes the moving plate (61), which is slidingly connected with an inner side wall of said fishway body (1), a plurality of racks (62) is fixed on an upper side of the moving plate (61), one of the plurality of racks (62) meshes with a gear (63), which is fixedly connected with a lower side of the auxiliary swimming board (21) by means of a fixing shaft (26), a lower side of the moving plate (61) is excavated with a groove fitting with a pushing rod (64) and a pushing column (66), respectively, the pushing rod (64) and the pushing column (66) are both articulated on the inner side wall of said fishway body (1), a lower side of the pushing rod (64) props against a top of a fixing rod (65), a lower side of the pushing column (66) props against a fixing column (67), and the fixing rod (65) and the pushing column (66) both pass through a thorough hole of the fishway body (1) and are fixed on an upper end of a fixing frame (52) of said floating dock structure (5).

* * * * *